US012509586B2

(12) United States Patent
Praw et al.

(10) Patent No.: US 12,509,586 B2
(45) Date of Patent: Dec. 30, 2025

(54) ASPHALT COMPOSITION COMPRISING A MIXTURE OF AN ISOCYANATE AND A POLYMER AS PERFORMANCE ADDITIVES

(71) Applicant: BASF SE, Ludwigshafen am Rhein (DE)

(72) Inventors: Michael Praw, Conroe, TX (US); Waldemar Schatz, Lemfoerde (DE); Arlis A. Kadrmas, Charlotte, NC (US); William J. Kirk, Charlotte, NC (US); James T. Andrews, Charlotte, NC (US); Iran Otero Martinez, Lemfoerde (DE); Bernie Lewis Malonson, Wyandotte, MI (US); Olivier Fleischel, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 1355 days.

(21) Appl. No.: 17/268,584

(22) PCT Filed: Aug. 9, 2019

(86) PCT No.: PCT/EP2019/071400
§ 371 (c)(1),
(2) Date: Feb. 15, 2021

(87) PCT Pub. No.: WO2020/035403
PCT Pub. Date: Feb. 20, 2020

(65) Prior Publication Data
US 2021/0198491 A1 Jul. 1, 2021

(30) Foreign Application Priority Data
Aug. 15, 2018 (EP) ..................................... 18189142

(51) Int. Cl.
*C08L 95/00* (2006.01)
*C08G 18/64* (2006.01)
*C08G 18/76* (2006.01)
*C08L 53/02* (2006.01)
*C08L 85/02* (2006.01)

(52) U.S. Cl.
CPC .......... *C08L 95/00* (2013.01); *C08G 18/6476* (2013.01); *C08G 18/7657* (2013.01); *C08L 53/02* (2013.01); *C08L 85/02* (2013.01); *C08L 2555/22* (2013.01); *C08L 2555/24* (2013.01); *C08L 2555/84* (2013.01)

(58) Field of Classification Search
CPC ................ C08L 95/00; C08L 95/005
See application file for complete search history.

(56) References Cited

U.S. PATENT DOCUMENTS

| 3,650,791 A * | 3/1972 | Fauber ............... C08G 18/6476 |
| | | 208/22 |
| 4,301,051 A | 11/1981 | Marzocchi et al. |
| 4,415,702 A | 11/1983 | Ono et al. |
| 2009/0182074 A1* | 7/2009 | Scholten ................ C08L 95/00 |
| | | 524/68 |
| 2015/0133586 A1* | 5/2015 | Martin .................... C08L 53/00 |
| | | 524/71 |
| 2015/0191597 A1 | 7/2015 | Hacker et al. |
| 2015/0240082 A1 | 8/2015 | Smith et al. |

FOREIGN PATENT DOCUMENTS

| CN | 106146775 A | 11/2016 | |
| CN | 107778890 A | 3/2018 | |
| EP | 0537638 A1 | 4/1993 | |
| EP | 0957134 A1 | 11/1999 | |
| JP | 2003-261772 A | 9/2003 | |
| JP | 2016-210647 A | 12/2016 | |
| WO | 01/30912 A1 | 5/2001 | |
| WO | 01/30913 A1 | 5/2001 | |
| WO | WO-0130911 A1 * | 5/2001 | ............. C08L 95/00 |

OTHER PUBLICATIONS

PAPI 27 Technical Data Sheet, Mar. 2001. (Year: 2001).*
Martin-Alfonso, et al., "Use of a MDI-functionalized reactive polymer for the manufacture of modified bitumen with enhanced properties for roofing applications", European Polymer Journal, vol. 44, Issue 5, May 2008, pp. 1451-1461.
European Search Report for EP Patent Application No. 18189142.5, Issued on Feb. 20, 2019, 6 pages.
Ge et al., "Modification mechanism of asphalt modified with Sasobit and Polyphosphoric acid (PPA)", Construction and Building Materials, vol. 143, Jul. 15, 2017, pp. 419-428.
Hunter, et al., "The Shell Bitumen Handbook", Shell International Petroleum Company Ltd., 6th Edition, Ed. Robert Hunter, 2015, 17 pages.
International Preliminary Report on Patentability received for PCT Patent Application No. PCT/EP2019/071400, mailed on Feb. 25, 2021, 12 pages.
International Search Report and Written Opinion received for PCT Patent Application No. PCT/EP2019/071400, mailed on Sep. 4, 2019, 16 pages.
J-F. Masson, "Brief Review of the Chemistry of Polyphosphoric Acid (PPA) and Bitumen", Energy & Fuels, vol. 22, Issue 4, Jun. 6, 2008, pp. 2637-2640.

(Continued)

*Primary Examiner* — Christopher M Rodd
(74) *Attorney, Agent, or Firm* — Faegre Drinker Biddle & Reath LLP

(57) ABSTRACT

An asphalt composition comprising 0.1 to 8 wt.-% based on the total weight of the composition of an Isocyanate as thermosetting reactive compound and 0.1 to 8 wt.-% based on the total weight of the composition of a polymer selected from the group consisting of styrene/butadiene/styrene copolymer (SBS), styrene butadiene rubber (SBR), neoprene, polyethylene, low density polyethylene, oxidized high density polyethylene, polypropylene, oxidized high density polypropylene, maleated polypropylene, ethylene-butyl-acrylate-glycidyl-methacrylate terpolymer, ethyl vinyl acetate (EVA) and polyphosphoric acid (FRA).

17 Claims, No Drawings

(56) References Cited

OTHER PUBLICATIONS

Liang, et al., "Improving thermo-rheological behavior and compatibility of SBR modified asphalt by addition of polyphosphoric acid (PPA)", Construction and Building Materials, vol. 139, May 15, 2017, pp. 183-192.

Martin-Alfonso, et al., "Effect of processing temperature on the bitumen/MDI-PEG reactivity", Fuel Processing Technology, vol. 90, Issue 4, Apr. 2009, pp. 525-530.

Mckay, et al., "The influence of styrene-butadiene diblock copolymer on styrene-butadiene-styrene triblock copolymer viscoelastic properties and product performance", Journal of Applied Polymer Science, vol. 56, Issue 8, May 23, 1995, pp. 947-958.

Singh, et al., "Use of isocyanate production waste in the preparation of improved waterproofing bitumen", Journal of Applied Polymer Science, vol. 90, Issue 5, Aug. 28, 2003, pp. 1365-1377.

Yadollahi, et al., "Improving the performance of Crumb Rubber bitumen by means of Poly Phosphoric Acid (PPA) and Vestenamer additives", Construction and Building Materials, vol. 25, Issue 7, Jul. 2011, pp. 3108-3116.

Zhu, et al., "Polymer modification of bitumen: Advances and challenges", European Polymer Journal, vol. 54, May 2014, pp. 18-38.

* cited by examiner

ASPHALT COMPOSITION COMPRISING A MIXTURE OF AN ISOCYANATE AND A POLYMER AS PERFORMANCE ADDITIVES

CROSS-REFERENCE TO RELATED APPLICATIONS

This application is a national stage application (under 35 U.S.C. § 371) of PCT/EP2019/071400, filed Aug. 9, 2019, which claims benefit of European Application No. 18189142.5, filed Aug. 15, 2018, both of which are incorporated herein by reference in their entirety.

This invention essentially relates to an asphalt composition comprising an isocyanate and a polymer which is selected from the group consisting of styrene/butadiene/styrene copolymer (SBS), styrene butadiene rubber (SBR), neoprene, polyethylene, low density polyethylene, oxidized high density polyethylene, polypropylene, oxidized high density polypropylene, maleated polypropylene, ethylene-butyl-acrylate-glycidyl-methacrylate terpolymer, ethyl vinyl acetate (EVA) and polyphosphoric acid (PPA) as asphalt modifiers.

The present invention also relates to a process for the preparation of an asphalt composition. The asphalt composition of the present invention shows an increase in the functional temperature range as for example the useful temperature range of the asphalt, increased elasticity and a lower potential of deformation.

In general asphalt is a colloidal material containing different molecular species classified into asphaltenes and maltenes. Asphalt being viscoelastic and thermoplastic suffers property variation over a range of temperatures, from extreme cold to extreme heat. Asphalt tends to soften in hot weather and crack in extreme cold. At cold temperatures, asphalts become brittle and are subject to crack while at elevated temperatures they soften and lose physical properties.

The addition of a thermosetting reactive component such as isocyanates as binders respectively in more general terms as modifier allows the physical properties of the asphalt to remain more constant over a range of temperatures and/or improve the physical properties over the temperature range the asphalt is subjected to.

Such asphalts that are modified by added binders respectively modifiers are known for years in the state of the art. But there is still a need in the asphalt industry, however, for improved asphalts. In part this is because currently known polymer-modified asphalts have a number of deficiencies. These include susceptibility to for instance permanent deformation (rutting), flexural fatigue, moisture, decrease of elasticity at low temperature operation.

WO 01/30911 A1 discloses an asphalt composition comprising, by weight based on the total weight of the composition, about 1 to 8%, of a polymeric MDI, where the polymeric MDI has a functionality of at least 2.5. It also relates to a process for preparing said asphalt composition, using reaction times of below 2 hours. The formation of the product MDI-asphalt is measured by an increase in the product's viscosity or more preferably by dynamic mechanical analysis (DMA).

WO 01/30912 A1 discloses an aqueous asphalt emulsion comprising, besides asphalt and water, an emulsifiable polyisocyanate. It also relates to an aggregate composition comprising said emulsion, and to processes for preparing said compositions WO 01/30913 A1 discloses an asphalt composition comprising, by weight based on the total weight of the composition, about 1 to 5%, of a polymeric MDI based prepolymer, where the polymeric MDI has a functionality of at least 2.5. It also relates to a process for preparing said asphalt composition.

EP 0 537 638 B1 discloses polymer modified bitumen compositions which contain 0.5 to 10 parts by weight of functionalized polyoctenamer to 100 parts by weight of bitumen and, optionally, crosslinking agents characterized in that the polyoctenamer is predominantly a trans-polyoctenamer and contains carboxyl groups, as well as groups derived therefrom for example maleic acid.

US 2015/0191597 A1 discloses asphalt binder compositions comprising asphalt and a polymer blend, wherein the polymer blend comprises oxidized high density polyethylene and another polymer chosen from: maleated polypropylene, polyethylene homopolymer, high crystallinity polyethylene, and combinations thereof. It has been found that the addition of certain blends of polymers to asphalt binder compositions broadens the PG range and increases the UTI of the asphalt binder compositions.

Consequently, it would be highly desirable to have an asphalt composition and a related preparation process at hand which could avoid all the disadvantages associated with the prior art, for example limited elastic response, high non-recoverable creep compliance (Jnr), limited useful temperature interval and low softening point.

One of the objects of the present invention was to provide an asphalt composition showing improved physical properties in terms of being more constant over a range of temperatures. Furthermore, an asphalt composition was sought that has an increased elastic response, reduces the non-recoverable creep compliance (Jnr), shows an increase in the useful temperature interval (UTI), has an increased load rating, has a reduced potential for permanent asphalt deformations in situations of increased traffic levels respectively reduced speeds, a good adhesion and an increased softening point as well as a decreased needle penetration.

Furthermore, a respective asphalt composition preparation process was to be provided.

The different physical properties of the asphalt composition are measured by different tests known in the art and described in detail in the experimental section.

Elastic response and non-recoverable creep compliance (Jnr) are computed in in the Multiple Stress Creep Recovery (MSCR) test in which the asphalt is subjected to a constant load for a fixed time. The total deformation for a specific period of time is given in % and correspond to a measure of the elasticity of the binder.

A Bending Beam Rheometer (BBR) is used to determine the stiffness of asphalt at low temperatures and usually refer to flexural stiffness of the asphalt. These parameters give an indication of an asphalt binder's ability to resist to low temperature cracking. The BBR is used to determine an asphalt binder's low temperature grade.

Accordingly, an asphalt composition was found comprising 0.1 to 8 wt.-% based on the total weight of the composition of an isocyanate and 0.1 to 8 wt.-% based on the total weight of the composition of a polymer selected from the group consisting of styrene/butadiene/styrene copolymer (SBS), styrene butadiene rubber (SBR), neoprene, polyethylene, low density polyethylene, oxidized high density polyethylene, polypropylene, oxidized high density polypropylene, maleated polypropylene, ethylene-butyl-acrylate-glycidyl-methacrylate terpolymer, ethyl vinyl acetate (EVA) and polyphosphoric acid (PPA) as asphalt modifiers.

According to a further aspect of the invention there is provided a process for the preparation of an asphalt composition comprising the following steps:
a) Heating up the starting asphalt to a temperature of from 110 to 190° C.
b) Adding the desired amount of isocyanate and the respective polymer under stirring, wherein the order of adding the desired additives is not decisive
c) After step b) the reaction mixture is stirred at a temperature in the range of from 110 to 190° C.
d) The end of the reaction is determined by IR spectroscopy wherein the reaction is under an oxygen atmosphere. which fulfills the objects of the invention. In addition, there is provided the use of an asphalt composition for the preparation of an asphalt mix composition.

Surprisingly, it could be found that an asphalt composition comprising a combination of isocyanate and polymer according to the invention is showing a severe increase of the useful temperature interval, an increased elastic response, a drastic decrease of the non-recoverable creep compliance (Jnr), an increase of load rating as well as a reduced potential for permanent asphalt deformations.

The modification with only thermosetting reactive groups as for example isocyanates may not be sufficient to fulfil the elastic recovery tests. This test has been developed by the asphalt industry for polymer modified asphalts (PmA), in order to determine if the product has been properly modified. Therefore, a minimum value of elastic recovery need to be fulfilled. Because of the nature of the modification with a thermosetting resin, which is not an elastomer, such test can't be fulfilled. However, combination of isocyanates with polymers surprisingly lead to an increased elastic response, a drastic decrease of the non-recoverable creep compliance (Jnr) permitting to reach the minimum value requested for polymer modified asphalts (PmA). Depending on the composition the value of elastic recovery response for generally known PmA's can be as low as 30%, in the best case above 50% and for an improved or highly modified asphalt composition according to the invention above 80%.

Without being bound to this theory it is presently believed that this is due to the different reaction of the isocyanate as thermosetting reactive compound and the polymer with the different molecular species classified into asphaltenes and maltenes of the respective asphalt. A specific morphology of colloid structures is needed to obtain the resulting performances. A thermosetting reactive compound will react with the phenolic, carboxylic, thiol, anhydride and/or pyrrolic group or any reactive group from the asphalt components and link the asphaltenes together, leading to larger particles in the resulting asphalt composition. In addition to that the polymer will modify the maltene phase supporting the formation of an improved colloidal structure of the modified asphalt resulting in a not to be expected performance especially in terms of an increased elastic response and a drastic decrease of the non-recoverable creep compliance (Jnr).

Preferred embodiments are explained in the claims and the specification. It is understood that combinations of preferred embodiments are within the scope of the present invention.

According to the invention, the asphalt composition comprises an isocyanate as thermosetting reactive compound and a polymer selected from the group consisting of styrene/butadiene/styrene copolymer (SBS), styrene butadiene rubber (SBR), neoprene, polyethylene, low density polyethylene, oxidized high density polyethylene, polypropylene, oxidized high density polypropylene, maleated polypropylene, ethylene-butyl-acrylate-glycidyl-methacrylate terpolymer, ethyl vinyl acetate (EVA) and polyphosphoric acid (PPA) as asphalt modifiers.

Generally, an asphalt used in the present invention can be any asphalt known and generally covers any bituminous compound. It can be any of the materials referred to as bitumen, asphalt binder or asphalt. For example distillate, blown, high vacuum and cut-back bitumen, and also for example asphalt concrete, cast asphalt, asphalt mastic and natural asphalt. For example, a directly distilled asphalt may be used, having, for example, a penetration of 80/100 or 180/220. For example, the asphalt can be free of fly ash.

Preferably the asphalt has a penetration of 20-30, 30-45, 35-50, 40-60, 50-70, 70-100, 100-150, 160-220, 250-330 or performance grades of 52-16, 52-22, 52-28, 52-34, 52-40, 58-16, 58-22, 58-28, 58-34, 58-40, 64-16, 64-22, 64-28, 64-34, 64-40, 70-16, 70-22, 70-28, 70-34, 70-40, 76-16, 76-22, 76-28, 76-34, 76-40, more preferably the asphalt has a penetration of 30-45, 35-50, 40-60, 50-70, 70-100, 100-150, 160-220 or performance grades of 52-16, 52-22, 52-28, 52-34, 52-40, 58-16, 58-22, 58-28, 58-34, 58-40, 64-16, 64-22, 64-28, 64-34, 70-16, 70-22, 70-28, 76-16, 76-22, most preferably the asphalt has a penetration 40-60, 50-70, 70-100, 100-150 or performance grades of 52-16, 52-22, 52-28, 52-34, 52-40, 58-16, 58-22, 58-28, 58-34, 64-16, 64-22, 64-28, 70-16, 70-22, 76-16, 76-22.

Generally, a thermosetting reactive compound is a compound which could chemically react with the different molecular species classified into asphaltenes and maltenes of the respective asphalt and helps to generate a specific morphology of colloid structures resulting in physical properties of the asphalt to remain more constant over a broad range of temperatures and/or even improve the physical properties over the temperature range the asphalt is subjected to.

According to the invention the amount of an isocyanate as thermosetting reactive compound in the asphalt composition is not more than 8.0 wt. % based on the total weight of the asphalt composition. Preferably not more than 5.0 wt. %, more preferably not more than 4.0 wt. %, most preferably not more than 3.0 wt. %, based on the total weight of the asphalt composition. According to the invention, the amount of an isocyanate as thermosetting reactive compound in the asphalt composition is at least 0.1 wt. %, preferably at least 0.5 wt. %, more preferably at least 0.7 wt. %, most preferably at least 0.9 wt. % based on the total weight of the asphalt composition. For example the amount of an isocyanate as thermosetting reactive compound in the asphalt composition can be in the range of from 0.5 wt. % to 3.8 wt. %, in the range of from 0.8 wt. % to 2.7 wt. %, in the range of from 1.0 wt. % to 3.9 wt. %, in the range of from 1.1 wt. % to 2.0 wt. %, in the range of from 1.8 wt. % to 3.2 wt. %, in the range of from 2.1 wt. % to 3.7 wt. %, or in the range of from 0.5 wt. % to 3.5 wt. %.

The isocyanate as thermosetting reactive compound according to the invention can be any isocyanate, provided it is compatible with the asphalt, preferably it is Toluene diisocyanate (TDI), Hexamethylene diisocyanate (HDI), polymeric MDI, monomeric MDI, MDI prepolymers, more preferably it is TDI, polymeric MDI, monomeric MDI, most preferably it is polymeric MDI, monomeric MDI, for example polymeric MDI.

Generally, TDI is known in the art and is known as Toluene diisocyanate (TDI) it is an organic compound which occurs in different isomers. According to the invention any of the known isomers or mixtures of different isomers of TDI can be used, provided it is compatible with the asphalt.

Preferably it is pure 2,4-TDI or a mixture of 2,4 and 2,6 TDI, more preferably it is a mixture of 2,4 and 2,6-TDI isomers, for example a 80/20 or 65/35 mixture of the 2,4 and 2,6-TDI isomers.

Generally, HDI is known in the art and is known as Hexamethylene diisocyanate (HDI) which is an aliphatic diisocyanate. According to the invention any of the known HDI's can be used, provided it is compatible with the asphalt.

Generally, MDI prepolymer is known in the art and is the reaction product of polymeric MDI with a polyol. The polymeric MDI as one part of the MDI prepolymer is known in the art and is known as polymethylene polyphenylene polyisocyanate and is also referred to as polyarylene polyisocyanate or polyphenylmethane poly-isocyanate. It may comprises varying amounts of isomers like for example 4,4'-, 2,2'- and 2,4'-isomers. Preferably the amount of 4,4'MDI isomers is in the range of from 26% to 98%, more preferably in the range of from 30% to 95%, most preferably in the range of from 35% to 92%. Preferably the 2 rings content of polymeric MDI is in the range of from 20 to 62, more preferably in the range of from 26% to 48%, most preferably in the range of from 26% to 42%. It can also comprise modified variants containing carbodiimide, uretonimine, isocyanurate, urethane, allophanate, urea or biuret groups. This all will be referred to in the following as pMDI. The polyol that is used to prepare the prepolymer is any polyol that can be used in the instant field, provided it is compatible with the asphalt. One can use any high molecular weight polyol used in the invention may be any of the polyols, or mixtures thereof, used in the manufacture of polyurethanes, having an average hydroxyl equivalent weight of at least 500, preferably from 500 to 5000. These polyols can be polyether polyols, polyester polyols, polyesteramides polyols, polythioether polyols, polycarbonate polyols, polyacetal polyols, polyolefin polyols, and the like. Preferred polyols are polyether (especially polypropyleneglycol), polyester (especially aromatic polyesters), and polyolefin (especially polybutadiene) polyols. The functionality of the polyol is preferably 2-4, more preferably 2-3 and most preferably 2. One particularly preferred polyol is Polypropyleneglycol (PPG), for example PPG 2000. Processes known to those skilled in the art can be used to produce the prepolymer. The NCO value of the prepolymer can vary within broad limits. It can be from about 6 to 25, preferably from about 9 to 22. The ratio polyol/pMDI can in fact vary from 65/35 to 20/80 weight ratio.

Generally, polymeric MDI is known in the art and is known as polymethylene polyphenylene polyisocyanate and is also referred to as polyarylene polyisocyanate or polyphenylmethane polyisocyanate. It may comprises varying amounts of isomers like for example 4,4'-, 2,2'- and 2,4'-isomers. Preferably the amount of 4,4'MDI isomers is in the range of from 26% to 98%, more preferably in the range of from 30% to 95%, most preferably in the range of from 35% to 92%. Preferably the 2 rings content of polymeric MDI is in the range of from 20 to 62, more preferably in the range of from 26% to 48%, most preferably in the range of from 26% to 42%. It can also comprise modified variants containing carbodiimide, uretonimine, isocyanurate, urethane, allophanate, urea or biuret groups. This all will be referred to in the following as pMDI. Preferably the pMDI used according to the invention has an average isocyanate functionality of at least 2.3, more preferably of at least 2.5, most preferably of at least 2.7, for example 2.8, 2.9 or 3.0.

Generally, the purity of the polymeric MDI is not limited to any value, preferably the pMDI used according to the invention has an iron content of from 1 to 100 ppm, more preferably of from 1 to 70 ppm, most preferably of from 1 to 60 ppm Generally, monomeric MDI (mMDI) is known in the art and is known as methylene diphenyl diisocyanate. It may occur in form of different isomers like for example 4,4'-, 2,2'- and 2,4'-isomers. According to the invention any of the known isomers or mixtures of different isomers of mMDI can be used, provided it is compatible with the asphalt. Preferably it is pure 4,4'-MDI, a mixture of 2,4'-MDI and 4,4'-MDI, a mixture of 2,4'-MDI and 4,4'-MDI with reduced 2,2'-MDI content, more preferably it is pure 4,4'-MDI, a mixture of 2,4'-MDI and 4,4'-MDI, most preferably it is pure 4,4'-MDI. Preferably the amount of 4,4'MDI isomers is in the range of from 40 to 99.5%, more preferably in the range of from 44% to 99%, most preferably in the range of from 46% to 98.5%.

It can also comprise modified variants containing carbodiimide, uretonimine, isocyanurate, urethane, allophanate, urea or biuret groups. This all will be referred to in the following as mMDI. Preferably the mMDI used according to the invention has an average isocyanate functionality of at least 2.0, more preferably of at least 2.1, most preferably of at least 2.15, for example 2.2, 2.3 or 2.4.

Generally, a polymer is a large molecule, or macromolecule, which structure is composed of multiple repeating units, from which a high relative molecular mass and unique physical properties originate. Polymers, both natural and synthetic, are created via polymerization of many small molecules, known as monomers. Beside the molecular weight of a polymer another important characteristic of polymers is their structure. Polymers can be simple straight chains or many variations of linked and crosslinked chains. Both the structure and the chemistry of branches can influence the behaviour of polymers. The terms random copolymer and block copolymer refer to the chemical composition of the polymer. A random copolymer is some combination, without a specific ordering, of different monomers linked together. A block copolymer refers to a block of one homopolymer (i.e., a chain of the same monomers) linked with another block of a different homopolymer. In the context of this invention also molecules like polyphosphoric acid (PPA) build of inorganic monomers (orthophosphoric acid ($H_3PO_4$) fall under the broad definition of a polymer. Polymers that may be suitable for the use in asphalt compositions can be separated into one of two general categories of polymers: plastomers and elastomers. Plastomers are materials that exhibit a quick early strength under load but tend to exhibit little ability to strain without brittle failure. Any deformation of these materials is permanent; they have little or no elastic component, for example polyethylene, low density polyethylene, oxidized high density polyethylene, polypropylene, oxidized high density polypropylene, maleated polypropylene, ethylene-butyl-acrylate-glycidyl-methacrylate terpolymer, ethyl vinyl acetate (EVA) and polyphosphoric acid (PPA). These plastomers are typically classified as paraffins. Elastomers resist permanent deformation by an ability to stretch and recover their original shape once the load is removed, for example styrene/butadiene/styrene copolymer (SBS), styrene butadiene rubber (SBR), neoprene. These elastomers are considered rubbers, either natural or synthetic.

Not only are there different polymer chemistries within each category, there are also different methods used to manufacture a given type of polymer. Differences in manufacturing processes can have a potential impact on the end product due to trace amounts of chemicals used in the polymerization processes remaining in the finished product.

According to the invention the amount of a polymer selected from the group consisting of styrene/butadiene/styrene copolymer (SBS), styrene butadiene rubber (SBR), neoprene, polyethylene, low density polyethylene, oxidized high density polyethylene, polypropylene, oxidized high density polypropylene, maleated polypropylene, ethylene-butyl-acrylate-glycidyl-methacrylate terpolymer, ethyl vinyl acetate (EVA) and polyphosphoric acid (PPA) in the asphalt composition is not more than 8.0 wt. % based on the total weight of the asphalt composition. Preferably not more than 5.0 wt. %, more preferably not more than 4.0 wt. %, most preferably not more than 3.0 wt. %, based on the total weight of the asphalt composition. According to the invention, the amount of a polymer selected from the group consisting of styrene/butadiene/styrene copolymer (SBS), styrene butadiene rubber (SBR), neoprene, polyethylene, low density polyethylene, oxidized high density polyethylene, polypropylene, oxidized high density polypropylene, maleated polypropylene, ethylene-butyl-acrylate-glycidyl-methacrylate terpolymer, ethyl vinyl acetate (EVA) and polyphosphoric acid (PPA) in the asphalt composition is at least 0.1 wt. %, preferably at least 0.5 wt. %, more preferably at least 0.7 wt. %, most preferably at least 0.9 wt. % based on the total weight of the asphalt composition. For example the amount of a polymer selected from the group consisting of styrene/butadiene/styrene copolymer (SBS), styrene butadiene rubber (SBR), neoprene, polyethylene, low density polyethylene, oxidized high density polyethylene, polypropylene, oxidized high density polypropylene, maleated polypropylene, ethylene-butylacrylate-glycidyl-methacrylate terpolymer, ethyl vinyl acetate (EVA) and polyphosphoric acid (PPA) in the asphalt composition can be in the range of from 0.5 wt. % to 3.8 wt. %, in the range of from 0.8 wt. % to 2.7 wt. %, in the range of from 1.0 wt. % to 3.9 wt. %, in the range of from 1.1 wt. % to 2.0 wt. %, in the range of from 1.8 wt. % to 3.2 wt. %, in the range of from 2.1 wt. % to 3.7 wt. %, or in the range of from 0.5 wt. % to 3.5 wt. %.

Suitable polymers according to the invention are selected from the group consisting of styrene/butadiene/styrene copolymer (SBS), styrene butadiene rubber (SBR), neoprene, polyethylene, low density polyethylene, oxidized high density polyethylene, polypropylene, oxidized high density polypropylene, maleated polypropylene, ethylene-butyl-acrylate-glycidyl-methacrylate terpolymer, ethyl vinyl acetate (EVA) and polyphosphoric acid (PPA).

Generally, styrene/butadiene/styrene copolymers (SBS) are known in the art. SBS is a thermoplastic elastomer made with two monomers, which are styrene and butadiene. Therefore, SBS shows the properties of plastic and rubber at the same time. Due to these properties, it is widely used in a variety of areas including the use as asphalt modifying agent and adhesives. SBS-copolymers are based on block copolymers having a rubber center block and two polystyrene end blocks also named as triblock copolymer A-B-A. SBS elastomers combine the properties of a thermoplastic resin with those of butadiene rubber. The hard, glassy styrene blocks provide mechanical strength and improve the abrasion resistance, while the rubber mid-block provides flexibility and toughness. SBS rubbers are often blended with other polymers to enhance their performance. Often oil and fillers are added to lower cost or to further modify the properties. Various properties of these thermoplastics can be obtained by selecting A and B from a range of molecular weights.

Generally, any of known SBS-copolymers can be used, provided it is compatible with the asphalt. Suitable SBS-copolymers are not limited in their structure, they can be branched or linear, preferably the SBS-copolymers are linear. Suitable SBS-copolymers are not particularly limited in their styrene content. Preferably, the styrene/butadiene/styrene (SBS) copolymers have a styrene content of from 10 to 50 wt.-% based on the total weight of the polymer, more preferably a styrene content of from 15 to 45 wt.-% based on the total weight of the polymer, most preferably a styrene content of from 20 to 42 wt.-% based on the total weight of the polymer, for example a styrene content of 22, 23, 26, 28, 30, 32, 34, 36, 38 or 39 wt.-% based on the total weight of the polymer.

Generally the molecular weight of suitable SBS-copolymers can be in the range of from 10,000 g/mol to 1,000,000 g/mol, preferably the molecular weight of suitable SBS-copolymers is in the range of from 30,000 g/mol to 300,000 g/mol, most preferably the molecular weight of suitable SBS-copolymers is in the range of from 70,000 g/mol to 300,000 g/mol for example in the range of from 75,000 g/mol to 210,000 g/mol.

Generally, Styrene-butadiene or styrene-butadiene rubber (SBR) are known in the art and described as families of synthetic rubbers derived from styrene and butadiene. The styrene/butadiene ratio influences the properties of the polymer: with high styrene content, the rubbers are harder and less rubbery.

Generally, any of known SBR-copolymers can be used, provided it is compatible with the asphalt. Suitable SBR-copolymers are not limited in their structure, they can be branched or linear, preferably the SBR-copolymers are linear. Suitable SBR-copolymers are not particularly limited in their styrene content. Preferably, the SBR copolymers have a styrene content of from 10 to 50 wt.-% based on the total weight of the polymer, more preferably a styrene content of from 15 to 45 wt.-% based on the total weight of the polymer, most preferably a styrene content of from 20 to 42 wt.-% based on the total weight of the polymer, for example a styrene content of 22, 23, 26, 28, 30, 32, 34, 36, 38 or 39 wt.-% based on the total weight of the polymer.

Generally the molecular weight of suitable SBR-copolymers can be in the range of from molecular weight preferred ranges: 10,000 g/mol to 500,000 g/mol, preferably the molecular weight of suitable SBR-copolymers is in the range of from 50,000 g/mol to 250,000 g/mol, most preferably the molecular weight of suitable SBR-copolymers is in the range of from 70,000 g/mol to 150,000 g/mol for example in the range of from 75,000 g/mol to 135,000 g/mol.

Generally, neoprene is known in the art and is the generic name for polymers synthesized from chloroprene. It is often supplied in latex form. It may be a colloidal dispersion of chloroprene polymers prepared by emulsion polymerization. The neoprene structure is extremely regular although its tendency to crystallize can be controlled by altering the polymerization temperature. The final polymer is comprised of a linear sequence of trans-3-chloro-2-butylene units which are derived from the trans 1,4 addition polymerization of chloroprene.

Generally, any of the known neoprene can be used, provided it is compatible with the asphalt. Preferably a neoprene latex is used, preferably the neoprene latex has a solid content of from 30 to 60 wt.-% based on the total weight of the latex, more preferably a solid content of from 30 to 60 wt.-% based on the total weight of the latex, most preferably a solid content of from 30 to 60 wt.-% based on the total weight of the latex, for example a solid content of 45 wt.-% based on the total weight of the latex.

Generally, polyethylene and polypropylene homopolymers or copolymers as well as modified polyethylene and polypropylene polymers, for example low density polyethylene, oxidized high density polypropylene, maleated polypropylene are known in the art and described as families of polymers/copolymers based on the respective monomers. The molecular weight and the degree of crystallinity greatly influences the properties of these polymers. Polyethylene and polypropylene homopolymers or copolymers as well as modified polyethylene and polypropylene polymers with high levels of structuring show high tensile strengths but little ability to deform before failure. Less structuring results in an increased ability of the material to flow. For example polyethylenes, as is typical of paraffinic materials, are also relatively unreactive with most solvents. In addition to the molecular weight and the degree of crystallinity also the density has a large influence on the properties of the respective polymer since the lower densities represent less molecular packing, and hence less structuring. Low and high density polyethylenes are generally defined as those having a specific gravity of about 0.915 to 0.94 and approximately 0.96, respectively. Also modifiers incorporated as copolymers are used to disrupt the crystalline nature of the unmodified polymers for example polyethylene and this results in a more elastic, amorphous additive. The function of these polymers within the asphalt is not to form a network but to provide plastic inclusions within the matrix. At cold temperatures, these inclusions are intended to directly improve the binder's resistance to thermal cracking by inhibiting the propagation of cracks. At warm temperatures, the particle inclusions should increase the viscosity of the binder and therefore the mixture's resistance to rutting.

Generally, any of known polyethylene and polypropylene homopolymers or copolymers as well as modified polyethylene and polypropylene polymers can be used in the asphalt composition, provided it is compatible with the asphalt. Suitable polymers like polyethylene, low density polyethylene, oxidized high density polyethylene, polypropylene, oxidized high density polypropylene, maleated polypropylene, are not particularly limited in their molecular weight. Preferably each of, polyethylene, low density polyethylene, oxidized high density polyethylene, polypropylene, oxidized high density polypropylene, maleated polypropylene, has a weight average molecular weight (Mw) of from about 800 to 50,000 g/mol. More preferably each of the aforesaid polymers has a weight average molecular weight (Mw) of from about 1000 to 45,000 g/mol. Most preferably each of the aforesaid polymers has a weight average molecular weight (Mw) of from about 2000 to 42,000 g/mol. For example, the Mw of the aforesaid polymers may be from about 1,000 to about 5,000 g/mol, or from about 5,000 to about 10,000, or from about 10,000 to about 20,000 g/mol, or from about 20,000 to about 30,000 g/mol, or from about 30,000 to about 40,000 g/mol, or from about 40,000 to about 50,000 g/mol. Such polymers may be used as plastomers into asphalt binder composition.

Furthermore, suitable polymers like polyethylene, low density polyethylene, oxidized high density polyethylene, polypropylene, oxidized high density polypropylene, maleated polypropylene are not particularly limited in their crystallinity. Preferably each of, polyethylene, low density polyethylene, oxidized high density polyethylene, polypropylene, oxidized high density polypropylene, maleated polypropylene has a crystallinity of greater than 50%, based on the total weight of the polymer being described. More preferably each of the aforesaid polymers has a crystallinity in the range of from 52% to 99%, based on the total weight of the polymer being described. Most preferably each of the aforesaid polymers has a crystallinity in the range of from 55% to 90%, based on the total weight of the polymer being described. For example, without limitation, the aforesaid polymers may each have a crystallinity of greater than about 75%, or from about 50 to about 60%, or from about 60 to about 70%, or from about 70 to about 80%, or from about 80 to about 90%, or even from about 90 to about 99%, based on the total weight of the polymer being described. The crystallinity of the aforesaid polymers is determined by Differential Scanning calorimetry (DSC), which is a technique generally known in the art.

Generally, also complex polyethylene copolymers are known in the art as for example ethylenebutyl-acrylate-glycidyl-methacrylate terpolymer based on three different monomers. This family of copolymers is known as plasticizer resins which are improving flexibility and toughness. For example these copolymers are commercially available from DuPont, under the name Elvaloy® terpolymers.

Generally, any of known ethylene-butyl-acrylate-glycidyl-methacrylate terpolymer can be used in the asphalt composition, provided it is compatible with the asphalt. Suitable polymers like ethylene-butyl-acrylate-glycidyl-methacrylate terpolymer are not particularly limited in their molecular weight. Preferably ethylene-butyl-acrylate-glycidyl-methacrylate terpolymer has a weight average molecular weight (Mw) of from about 800 to 150,000 g/mol. More preferably the aforesaid copolymer has a weight average molecular weight (Mw) of from about 1500 to 120,000 g/mol. Most preferably the aforesaid copolymer has a weight average molecular weight (Mw) of from about 5000 to 90,000 g/mol.

Generally, ethylene and vinyl acetate copolymers (EVA) are known in the art and described as families of copolymers based on the respective monomers. The inclusion of the vinyl acetate is used to decrease the crystallinity of the ethylene structure and to help make the plastomer more compatible with the asphalt. Copolymers with about 30 percent vinyl acetate are classified as flexible, resins that are soluble in toluene and benzene. When the vinyl acetate percentage is increased to 45 percent, the resulting product is rubbery and may be vulcanized.

Generally, any of known EVA-copolymers can be used, provided it is compatible with the asphalt. Suitable EVA-copolymers are not limited in their structure, they can be branched or linear, preferably the EVA-copolymers are linear. Suitable EVA-copolymers are not particularly limited in their vinyl acetate content. Preferably, the EVA copolymers have a vinyl acetate content of from 20 to 60 wt.-% based on the total weight of the polymer, more preferably a vinyl acetate content of from 25 to 50 wt.-% based on the total weight of the polymer, most preferably a vinyl acetate content of from 30 to 45 wt.-% based on the total weight of the polymer, for example a vinyl acetate content of 32, 33, 34, 38, 40 or 42 wt.-% based on the total weight of the polymer. Such polymer may be used as plastomers into asphalt binder composition.

Generally, Polyphosphoric acid (PPA) is known in the art and is a polymer of orthophosphoric acid ($H_3PO_4$) of the general formula ($H_n+2P_nO_{3n}+1$). Polyphosphoric acid is a mixture of orthophosphoric acid with pyrophosphoric acid, triphosphoric and higher acids and is often characterized on the basis of its calculated content of $H_3PO_4$. Superphosphoric acid is a similar mixture differentiating in the content of $H_3PO_4$ and can be subsumed under the definition of PPA in the context of this invention. Generally, any of the known Polyphosphoric acids can be used, provided it is compatible with the asphalt. Suitable Polyphosphoric acids according to the invention are not limited in their structure and composition of orthophosphoric acid with pyrophosphoric acid, triphosphoric and higher acids, preferably the PPA is water-free. Preferably, the polyphosphoric acid (PPA) has a calculated $H_3PO_4$ content in the range of from 100 to 120%, more preferably the polyphosphoric acid (PPA) has a calculated $H_3PO_4$ content in the range of from 103 to 118%, most preferably the polyphosphoric acid (PPA) has a calculated $H_3PO_4$ content in the range of from 104 to 117%, for example the polyphosphoric acid (PPA) has a calculated $H_3PO_4$ content of 105, 106, 107, 108, 109, 110, 111, 112, 113, 114, 115 or 116%. Polyphosphoric acid is another substance that may be used as an additional additive in some embodiments of the asphalt binder composition, in conventional amount, for example to raise the product's softening point. The phosphoric acid may be provided in any suitable form, including a mixture of different forms of phosphoric acid. For example, some suitable different forms of phosphoric acid include phosphoric acid, polyphosphoric acid, superphosphoric acid, pyrophosphoric acid and triphosphoric acid.

Further optional additives known in the art may be added to the composition according to the invention in order to adapt the properties of the asphalt composition depending on the respective application. Additives may be for example waxes. These waxes if used as an additional additive in the asphalt binder composition may be functionalized or synthetic waxes, or naturally occurring waxes. Furthermore, the wax may be oxidized or non-oxidized. Non-exclusive examples of synthetic waxes included ethylene bis-stearamide was (EBS), Fischer-Tropsch wax (FT), oxidized Fischer-Tropsch wax (FTO), polyolefin waxes such as polyethylene wax (PE), oxidized polyethylene wax (OxPE), polypropylene wax, polypropylene/polyethylene wax alcohol wax, silicone wax, petroleum waxes such as microcrystalline wax or paraffin, and other synthetic waxes. Non-exclusive examples of functionalized waxes include amine waxes, amide waxes, ester waxes, carboxylic acid waxes, and microcrystalline waxes. Naturally occurring waxes may be derived from a plant, from an animal, or from a mineral, or from other sources. Non exclusive examples of natural waxes include plant waxes such as candelilla wax, carnauba wax, rice wax, Japan wax and jojoba oil; animal waxes such as beeswax, lanolin and whale wax; and mineral waxes such as montan wax, ozokerit and ceresin. Mixtures of the aforesaid waxes are also suitable, such as, for example, the wax may include a blend of a Fischer-Tropsch (FT) wax and a polyethylene wax.

Plasticizers may also be used as additional additives, in conventional amounts, to increase the plasticity or fluidity of an asphalt binder composition in accordance with embodiments described herein. Suitable plasticizers include hydrocarbon oils (e.g. paraffin, aromatic and naphthenic oils), long chain carbon diesters (e.g. phthalic acid esters, such as dioctyl phthalate, and adipic acid esters, such as dioctyl adipate), sebacic acid esters, glycol, fatty acid, phosphoric and stearic esters, epoxy plasticizers (e.g. epoxidized soybean oil), polyether and polyester plasticizers, alkyl monoesters (e.g. butyl oleate), long chain partial ether esters (e.g. butyl cellosolve oleate) among other plasticizers.

Anti-oxidants may be used in conventional amounts as additional additives for the asphalt binder compositions to prevent the oxidative degradation of polymers that causes a loss of strength and flexibility in these materials.

Conventional amounts with regard to the optional additives are in the range of from 0.1 to 5 wt. % based on the total amount of the respective asphalt composition. For example conventional amounts are 0.2 to 3 wt.-%, 0.5 to 2.8 wt.-% or 0.6 to 2.5 wt.-%.

Generally, the amount of isocyanate as thermosetting reactive compound and the amount of polymer may depend on the composition of the respective asphalt. For hard asphalt having a needle penetration below 85 less thermosetting reactive compound for example pMDI may be needed and for soft asphalt having a needle penetration above 85 a larger amount of the respective thermosetting reactive compound for example pMDI may be needed. Without being bound to this theory it is presently believed that the amount of the thermosetting reactive compound needs to be readjusted due to the different concentration of asphaltene in different asphalts. In soft asphalts which corresponds to a needle penetration above 85, asphaltenes are diluted, hence lower concentrated, which require a larger amount of the respective thermosetting reactive compound for example pMDI and more oxidation, which can be supplied by the oxygen atmosphere of the preparation process of an asphalt composition, to achieve better performance. The same can be imagined for the maltene phase of the respective asphalt with which the respective polymer are believed to interact.

Generally, for asphalt having a needle penetration below 85 which corresponds to a performance grade having a high temperature limit of at least 64, the amount of the isocyanate as thermosetting reactive compound selected from the group consisting of polymeric MDI, epoxy resins and melamine formaldehyde resins in the asphalt composition can be in the range of from 0.1 to 3.0 wt % preferably the amount of the thermosetting reactive compound is not more than 2.5 wt %, most preferably not more than 2.3 wt %, particularly not more than 2.0 wt % and the amount of the thermosetting reactive is at least 0.1 wt. %, preferably at least 0.5 wt. %, more preferably at least 0.7 wt. %, most preferably at least 1.0 wt. % based on the total weight of the asphalt composition.

Generally, for asphalt having a needle penetration above 85 which correspond to a performance grade having a high temperature limit of 64 or below, the amount of the thermosetting reactive compound selected from the group consisting of polymeric MDI, epoxy resins and melamine formaldehyde resins in the asphalt composition can be in the range of from 2.0 wt. % to 10.0 wt %, preferably the amount of the thermosetting reactive compound is not more than 5.0 wt %, most preferably not more than 4.5 wt %, particularly not more than 4.0 wt % and the amount of the thermosetting reactive is at least 2.0 wt. %, preferably at least 2.5 wt. %, more preferably at least 2.7 wt. %, most preferably at least 3.0 wt. % based on the total weight of the asphalt composition.

In addition to the above described also the amount of polymer can be adjusted in response to the characteristics of the used asphalt. The weight percent ratio of isocyanate as thermosetting reactive compound to polymer can be in the range of from 1:5 to 5:1, preferably in the range of from 1:4 to 4:1, more preferably in the range of from 1:3.5 to 3.5:1, most preferably in the range of from 1:3 to 3:1, for example 1:2 or 2:1.

Generally, by modifying an asphalt the performance in terms of different physical properties may be improved for example an increased elastic response can be achieved.

The combination of isocyanate and polymer as additive in an asphalt resulting in a synergetic effect, which means that an asphalt comprising the combination of isocyanate and polymer surprisingly shows much better performance, than an asphalt comprising each individual component alone.

The asphalt compositions of the present invention can be used as any classical asphalt compositions of the prior art. The asphalt compositions of the invention can notably be useful for the production of:
- paints and coatings, particularly for waterproofing,
- mastics for filling joints and sealing cracks
- grouts and hot-poured surfaces for surfacing of roads, aerodromes, sports grounds, etc.
- in admixture with stone to provide aggregates (comprising about 5-20% of the asphalt composition) e.g asphalt mix
- hot coatings for surfacing as above
- surface coatings for surfacing as above
- warm mix asphalt (WMA)
- hot mix asphalt (HMA)

Furthermore, the present invention relates to a process for the preparation of an asphalt composition according to the invention, comprising the following steps
- a) Heating up the starting asphalt to a temperature of from 110 to 190° C.
- b) Adding the desired amount of isocyanate and the respective polymer under stirring, wherein the order of adding the desired additives is not decisive
- c) After step b) the reaction mixture is stirred at a temperature in the range of from 110 to 190° C.
- d) The end of the reaction is determined by IR spectroscopy wherein the reaction is under an oxygen atmosphere.

For example, the process of the invention may be performed at a temperature of from 110 to 190° C. in step a) and or step c). Preferably the temperature is in the range of from 110 to 180° C., more preferably in the range of from 115 to 170° C., most preferably in the range of from 120 to 165° C., for example the temperature is in the range of from 121 to 162° C.

Generally, the temperatures in step a), b) and step c) are in the range of from 110 to 190° C. and may differ in every step. Preferably, the temperature in every of the three steps is the same and in the range of from 110 to 190° C., more preferably the same and in the range of from 110° C. to 170° C., most preferably the same and in the range of from 110° C. to 165° C.

According to the invention in step b) of the process for the preparation of the asphalt composition, the desired amount of isocyanate as thermosetting reactive compound and the desired amount of polymer is added under stirring. Maybe the isocyanate is added first and afterwards the desired amount of polymer or the other way around. Maybe the isocyanate and the polymer are added at the same time under stirring. The desired amount can be in the range of from 0.1 to 8 wt.-% based on the total weight of the composition for both components.

Generally, the amount may also be determined by potentiometric titration in which the number of reactive groups in an asphalt will be determined and correlated to the equivalent weight of reactive groups of the respective thermosetting compound. Titration methods are known in the art and are described in detail in the experimental section.

Generally, asphalt from different suppliers differ in terms of composition depending on which reservoir the crude oil is from, as well as the distillation process at the refineries. However, the cumulated total amount of reactive group for the isocyanate as thermosetting reactive compound can be in the range of from 3,1 to 4.5 mg KOH/g.

For example, asphalt having a penetration index of 50-70 or 70-100 result in a stoichiometric amount for pMDI to be 0,8 to 1,2% by weight. A further excess of isocyanate will be used to react with the newly formed functionalities due to oxidation sensitivity of the asphalt components under elevated temperatures during the preparation of the asphalt composition.

According to the invention the process step c) is performed after step b). The reaction mixture is stirred at a temperature in the range of from 110 to 190° C. for at least 1 h, preferably the mixing time is at least 1.5 h, more preferably the mixing time is at least 2 h, most preferably the mixing time is at least 2.5h, for example 1.8 or 2.2 h.

According to the invention the process for the preparation of an asphalt composition according to the invention, has to be performed under an oxygen atmosphere. Preferably the oxygen concentration in the oxygen atmosphere is in the range of from 1 to 21 Vol.-%, more preferably the oxygen concentration in the oxygen atmosphere is in the range of from 5 to 21 Vol.-%, most preferably the oxygen concentration in the oxygen atmosphere is in the range of from 10 to 21 Vol.-%, for example the process of the present invention is performed under air or under a saturated atmosphere of oxygen.

The process of the invention is not limited to a special asphalt as starting material which means that also commercially available polymer modified asphalt (PmA) can further be modified by the process of the present invention by adding an isocyanate as thermosetting compound and a polymer into a PmA or to dilute a PmA with a virgin bitumen and use this as starting material for the modification process according to the invention. It also may be that a commercially available PmA will be blended with a modified asphalt synthesized according to the process of the present invention.

Generally, the process is not limited to be performed in one reaction vessel for example a container. The respective asphalt may be reacted with an isocyanate as thermosetting reactive compound and a polymer in a first step under the conditions described above for example temperature 110° C. to 190° C. under oxygen for example for 0.5 hour. Then the asphalt can be cooled down, transferred to a different reaction vessel subsequent to the transfer heated up so that the total reaction time under oxygen is at least 1.0 h. With out to be bound by this theory it is presently believed that the steps a) and b) (the first step) is to homogenize the mixture and to induce the reaction of the reactive groups of the asphalt with the reactive groups of the respective thermosetting reactive compound and the polymer. The thermosetting reactive compound may be loaded on the asphaltene surfaces and the polymer contacts the respective maltene phase. The second or additional heating steps summarized as step c) is to support cross linking reaction by oxidation.

Examples of Asphalt Compositions According to the Invention

Z1: 1.2 to 3.5 wt.-% based on the total weight of the composition of pMDI as thermosetting reactive compound and 1.5 to 3.2 wt.-% based on the total weight of the composition of styrene/butadiene/styrene copolymer (SBS)

Z2: 1.2 to 3.5 wt.-% based on the total weight of the composition of pMDI as thermosetting reactive compound and 0.5 to 2.2 wt.-% based on the total weight of the composition of polyphosphoric acid (PPA)

Z3: 1.0 to 2.0 wt.-% based on the total weight of the composition of pMDI as thermosetting reactive compound and 2.0 to 3.2 wt.-% based on the total weight of the composition of styrene/butadiene/styrene copolymer (SBS)

Z4: 1.0 to 2.3 wt.-% based on the total weight of the composition of pMDI as thermosetting reactive compound and 0.5 to 1.5 wt.-% based on the total weight of the composition of styrene/butadiene/styrene copolymer (SBS)

Z5: 1.2 to 3.5 wt.-% based on the total weight of the composition of mMDI as thermosetting reactive compound and 1.5 to 3.2 wt.-% based on the total weight of the composition of styrene/butadiene/styrene copolymer (SBS)

Z6: 1.2 to 3.5 wt.-% based on the total weight of the composition of mMDI as thermosetting reactive compound and 0.5 to 2.2 wt.-% based on the total weight of the composition of polyphosphoric acid (PPA)

EXAMPLES AND COMPARATIVE EXAMPLES

General Procedure for the Preparation of an Asphalt Composition, Blend 1 to 10

Paving-type asphalt binder compositions comprising asphalt and various polymer blends, as specified below in table 1 and 2, were prepared and subjected to experimental steps to determine their performance.

The general procedure used to formulate was as follow:
(a) heating up the starting asphalt to a temperature up to 140° C. under oxygen atmosphere and under 250 to 400 rpm with a low shear mixer in an oil bath (temperature set up at 150° C.). (b) When the internal temperature of at least 140° C. was reached, polymeric additive was slowly added into the asphalt sample within a 2 minutes period. (c) The asphalt sample was stirred for 30 minutes. (d) The isocyanate was then added to the asphalt sample containing the polymer and mixed further. The reaction was followed by infrared until the isocyanate band is reached an absorption value below 150.

The samples were dispatched into cans before further testing and cooled down to room temperature.

Thermosetting reactive compound used in the Examples is a pMDI having a functionality of 2.7 named in the following As20.

The test specimens from blend 1 to 5 were prepared and tested according to AASHTO M320 (Table 1). The test specimen from blend 6 to 10 were prepared and tested according to the penetration grade system and European norms (Table 2). The values of the examples are detected according to the respective DIN regulation.

pMDI with respective functionality are commercially available for example at the following companies: Bayer, BASF SE, Huntsmann etc.

Detailed Description of the Used Method:
Asphalt Tests
Softening Point DIN EN 1427

Two horizontal disks of bitumen, cast in shouldered brass rings, are heated at a controlled rate in a liquid bath while each supports a steel ball. The softening point is reported as the mean of the temperatures at which the two disks soften enough to allow each ball, enveloped in bitumen, to fall a distance of (25±0,4) [mm].

Rolling Thin Film Oven Test DIN EN 12607-1

Bitumen is heated in bottles in an oven for 85 [min] at 163 [° C.]. The bottles are rotated at 15 [rpm] and heated air is blown into each bottle at its lowest point of travel at 4000 [mL/min]. The effects of heat and air are determined from changes in physical test values as measured before and after the oven treatment.

Pressure Aging Vessel DIN EN 14769

The residue from the RTFOT is placed in standard stainless-steel pans and aged at a specified conditioning temperature (90 [° C.], 100 [° C.] or 110 [° C.]) for 20 [h] in a vessel pressurized with air to 2.10 [MPa]. The temperature is selected according to the grade of the asphalt binder (application). Finally, the residue is vacuum degassed.

Dynamic Shear Rheometer (DSR) DIN EN 14770-ASTM D7175

A dynamic shear rheometer test system consists of parallel plates, a means for controlling the temperature of the test specimen, a loading device, and a control and data acquisition system.

Temperature Sweep DIN EN 14770

This test has the objective of measuring the complex shear modulus and phase angle (δ) of asphalt binders. The test consists in pressing an 8 or 25 [mm] diameter test specimen between parallel metal plates at a defined frequency and temperature. One of the parallel plates is oscillated with respect to the other at, in this case, 1.59 [Hz] and angular deflection amplitudes. The required amplitudes must be selected so that the testing is within the region of linear behavior. This is repeated at 30, 40, 50, 60, 70, 80 and 90 [° C.].

Multiple Stress Creep Recovery (MSCR) Test DIN EN 16659-ASTM D7405

This test method is used to determine the presence of elastic response after short term aging in an asphalt binder under shear creep and recover at two stress level (0,1 and 3,2 [kPa]) and at a specified temperature (50 [° C.]). This test uses the DSR to load a 25 [mm] at a constant stress for 1 [s], and then allowed to recover for 9 [s]. Ten creep and recovery cycles are run at 0.100 [kPa] creep stress followed by ten cycles at 3.200 [kPa] creep stress.

Elastic Recovery DIN EN 13398

A bituminous binder specimen (virgin) is stretched at the test temperature and a constant rate of 50 mm/min to a predetermined elongation (200 mm). The bitumen thread thus produced is cut in the middle to obtain two half-threads. After a predetermined time of 30 min for recovery has elapsed, the shortening of the half-threads is measured and expressed as the percentage of the elongation length. This procedure is typically performed at a test temperature of 25° C.

Bending Beam Rheometer DIN EN 14771-ASTM D6648

This test is used to measure the mid-point deflection of a simply supported prismatic beam of asphalt binder subjected to a constant load applied to its mid-point. A prismatic test specimen is placed in a controlled temperature fluid bath and loaded with a constant test load for 240 [s]. The test load (980±50 [mN]) and the mid-point deflection of the test specimen are monitored versus time using a computerized data acquisition system. The maximum bending stress at the midpoint of the test specimen is calculated from the dimensions of the test specimen, the distance between supports, and the load applied to the test specimen for loading times of 8.0, 15.0, 30.0, 60.0, 120.0 and 240.0 [s]. The stiffness of the test specimen for the specific loading times is calculated by dividing the maximum bending stress by the maximum bending strain.

TABLE 1

Asphalt compositions of blend 4 to 5 and of the comparative blends 1 to 3 as well as pure asphalt as control, composition and physical properties.

| Composition | Control | Blend 1 Comparative 1 | Blend 2 Comparative 2 | Blend 3 Comparative 3 | Blend 4 | Blend 5 |
|---|---|---|---|---|---|---|
| PG 58-28 | 100% | 98% | 97% | 98% | 95% | 96% |
| As20 | | 2% | | | 2% | 2% |
| SBS | | | 3% | | 3% | |
| PPA | | | | 2% | | 2% |
| Total additive loading | | 2% | 3% | 2% | 5% | 4% |
| Jnr (0.1 kPa) | 3.134 | 0.633 | 0.146 | 1.599 | 0.000 | 0.065 |
| Jnr (3.2 kPa) | 3.524 | 0.829 | 0.244 | 1.964 | 0.000 | 0.124 |
| MSCR (% recovery, 0.1 kPa) | 3 | 27 | 82 | 12 | >99 | 3 |
| MSCR (% recovery, 3.2 kPa) | 0.5 | 12 | 72 | 77 | >99 | 57 |
| RTFO High temperature (° C.) | 60.0 | 69.2 | 69.8 | 63.8 | 89.6 | 79.2 |
| Low temperature (° C.) | −29.8 | −29.3 | −31.1 | −26.7 | −30.8 | −23.7 |
| UTI | 89 | 98.5 | 100.8 | 90.5 | 120.4 | 102.4 |
| SHRP Grade | 58-28 | 64-28 | 64-28 | 58-22 | 88-28 | 76-22 |
| Grade jump | | +1 | +1 | −1 | +5 | +3 |

TABLE 2

Asphalt compositions of blend 9 to 10 and of the comparative blends 6 to 8 as well as pure asphalt as control, composition and physical properties of the respective asphalt compositions.

| Composition | Control | Blend 6 Comparative 6 | Blend 7 Comparative 7 | Blend 8 Comparative 8 | Blend 9 | Blend 10 |
|---|---|---|---|---|---|---|
| Pen 50/70 | 100% | 98% | 99% | 97% | 98% | 97% |
| As20 | | 2% | | | 1% | 2% |
| SBS | | | 1% | 3% | 1% | 1% |
| Total additive loading | | 2% | 1% | 3% | 2% | 3% |
| Softening Point (° C.) | 50.8 | 58.0 | 52.2 | 54.6 | 55.2 | 61.2 |
| G* in Pa at 60° C. | — | — | 4769 | 7537 | 9175 | 15879 |
| MSCR (% recovery, 0.1 kPa) | −0.7 | 45.1 | 12.4 | 35.4 | 30.8 | 63.4 |
| MSCR (% recovery, 3.2 kPa) | −3.5 | 29.0 | 8.2 | 19.2 | 16.4 | 53.8 |
| Phase angle (δ) in ° at 60° C. | — | 75 | 83.1 | 77.1 | 78.2 | 71.1 |
| Elastic recovery at 25° C. | — | 15 | 25 | 50 | 35 | 50 |

The asphalt modification according to the invention is leading to an improved performance with a severe increase of the useful temperature interval, an increased elastic response, a drastic decrease of the non-recoverable creep compliance (Jnr). The combination of isocyanate and polymer as additive in an asphalt resulting in a synergetic effect, which can clearly be shown by the examples of the present invention in table 1 and table 2.

The invention claimed is:

1. An asphalt composition comprising 0.1 to 8 wt.-% based on the total weight of the composition of an Isocyanate, wherein the isocyanate is polymeric MDI, wherein the polymeric MDI has a viscosity in the range of from 10 to 5000 cps/mPas at 25° C., and 0.1 to 8 wt.-% based on the total weight of the composition of a polymer selected from the group consisting of styrene/butadiene/styrene copolymer (SBS), and polyphosphoric acid (PPA).

2. The asphalt composition according to claim 1, wherein the isocyanate has a functionality of at least 2.0.

3. The asphalt composition according to claim 1, wherein the amount of polymeric MDI is of from 0.5 to 5.0 wt.-% based on the total weight of the composition.

4. The asphalt composition according to claim 1, wherein the polymer is a styrene/butadiene/styrene copolymer (SBS).

5. The asphalt composition according to claim 4, wherein the styrene/butadiene/styrene copolymer (SBS) is linear.

6. The asphalt composition according to claim 4, wherein the styrene/butadiene/styrene copolymer (SBS) has a styrene content of from 25 to 40 wt. % based on the total weight of the polymer.

7. The asphalt composition according to claim 4, wherein the amount of styrene/butadiene/styrene copolymer (SBS) is of from 0.8 to 3.0 wt.-% based on the total weight of the composition.

8. The asphalt composition according to claim 1, wherein the polymer is polyphosphoric acid (PPA).

9. The asphalt composition according to claim 8, wherein the polyphosphoric acid (PPA) has a calculated $H_3PO_4$ content in the range of from 100 to 120%.

10. The asphalt composition according to claim 8, wherein the polyphosphoric acid (PPA) is water-free.

11. The asphalt composition according to claim 8, wherein the amount of polyphosphoric acid (PPA) is of from 0.8 to 2.0 wt.-% based on the total weight of the composition.

12. A process for the preparation of an asphalt composition according to claim 1 comprising the following steps:
  a) Heating up the starting asphalt to a temperature of from 110 to 190° C.
  b) Adding the desired amount of isocyanate and the respective polymer under stirring, wherein the order of adding the desired additives is not decisive
  c) After step b) the reaction mixture is stirred at a temperature in the range of from 110 to 190° C.
  d) The end of the reaction is determined by IR spectroscopy wherein the reaction is under an oxygen atmosphere.

13. A process according to claim 12, wherein the temperature is in the range of from 110 to 165° C.

14. A process according to claim 12, wherein the temperature in step a) and step c) are the same and in the range of from 110 to 165° C.

15. A process according to claim 12, wherein the temperature is in the range of from 110 to 165° C. and the reaction mixture is stirred for at least 2 h after the addition step b).

16. A process according to claim 12, wherein the end of the reaction is determined by IR spectroscopy.

17. A method comprising providing the asphalt composition according to claim 1 and preparing an asphalt mix composition.

* * * * *